(12) United States Patent
Ando et al.

(10) Patent No.: US 10,566,139 B2
(45) Date of Patent: Feb. 18, 2020

(54) CERAMIC ELECTRONIC DEVICE

(71) Applicant: TDK CORPORATION, Tokyo (JP)

(72) Inventors: Norihisa Ando, Tokyo (JP); Sunao Masuda, Tokyo (JP); Masahiro Mori, Tokyo (JP); Kayou Matsunaga, Tokyo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/162,580

(22) Filed: Oct. 17, 2018

(65) Prior Publication Data

US 2019/0164694 A1 May 30, 2019

(30) Foreign Application Priority Data

Nov. 30, 2017 (JP) ................. 2017-230871

(51) Int. Cl.
*H01G 4/232* (2006.01)
*H01G 4/12* (2006.01)
*H01G 4/008* (2006.01)
*H01G 4/30* (2006.01)

(52) U.S. Cl.
CPC .......... *H01G 4/2325* (2013.01); *H01G 4/008* (2013.01); *H01G 4/12* (2013.01); *H01G 4/232* (2013.01); *H01G 4/30* (2013.01)

(58) Field of Classification Search
CPC .......... H01G 4/224; H01G 4/248; H01G 4/30; H01G 4/38; H01G 4/012; H01G 4/1227; H01G 4/1245; H01G 4/2325; H01G 4/008; H01G 4/12; H01G 4/232
USPC .......................................... 361/308.1, 321.2
See application file for complete search history.

(56) References Cited

U.S. PATENT DOCUMENTS

| 6,288,887 B1 | 9/2001 | Yoshida et al. | |
|---|---|---|---|
| 7,331,799 B1* | 2/2008 | Lee | H01G 2/06 361/306.3 |
| 2018/0033556 A1* | 2/2018 | Itamochi | H01C 7/008 |

FOREIGN PATENT DOCUMENTS

JP  2000-235932 A  8/2000

* cited by examiner

*Primary Examiner* — Michael P McFadden
(74) *Attorney, Agent, or Firm* — Oliff PLC

(57) ABSTRACT

A ceramic electronic device includes a chip component, a metal terminal, and a conductive connection member. The component includes a terminal electrode surface on which a terminal electrode is formed. The metal terminal includes an opposing surface to the electrode surface. The connection member contains at least Sn and Sb and connects the terminal electrode surface and the opposing surface. The connection member includes a first part and a second part. In the first part, a distance between the terminal electrode surface and the opposing surface is a first distance, and Sb/Sn is a first value. In the second part, a distance between the terminal electrode surface and the opposing surface is a second distance being smaller than the first distance, and Sb/Sn is a second value being larger than the first value.

4 Claims, 3 Drawing Sheets

CERAMIC ELECTRONIC DEVICE

BACKGROUND OF THE INVENTION

The present invention relates to a ceramic electronic device with metal terminal including a chip component and a metal terminal attached thereto.

In addition to a normal chip component that is solely directly mounted on a board, a chip component attached with a metal terminal is proposed as a ceramic electronic device, such as a ceramic capacitor. It is reported that the ceramic electronic device attached with a metal terminal after being mounted has a reduction effect on a deformation stress that travels from a board to a chip component and a protection effect on a chip component from impacts or so. Thus, the electronic device attached with a metal terminal is used in a field where durability, reliability, and the like are required.

Patent Document 1: JP2000235932 (A)

BRIEF SUMMARY OF INVENTION

As a connection member that connects a chip component and a metal terminal, a connection member containing Sn (tin) and Sb (antimony) is proposed. When a connection member containing Sb is used, this connection member is hard to be molten and is improved in heat resistance. Moreover, when a use amount of connection member is large, this connection member itself is improved in durability. When a use amount of connection member is large, however, the chip component may have cracks, and there is a problem with this ceramic electronic device.

The present invention has been achieved under such circumstances. It is an object to provide a ceramic electronic device having a favorable heat resistance even if a use amount of a connection member is small.

To achieve the above object, the ceramic electronic device according to the present invention comprises:

a chip component including a terminal electrode surface on which a terminal electrode is formed;

a metal terminal including an opposing surface to the terminal electrode surface; and a conductive connection member containing at least Sn and Sb and configured to connect the terminal electrode surface and the opposing surface, wherein the connection member comprises:

a first part whose distance between the terminal electrode surface and the opposing surface is a first distance and whose Sb/Sn is a first value; and a second part whose distance between the terminal electrode surface and the opposing surface is a second distance being smaller than the first distance and whose Sb/Sn is a second value being larger than the first value.

In the ceramic electronic device according to the present invention, the second part of the connection member with a small gap between the terminal electrode surface and the opposing surface has a larger Sb/Sn and a higher Sb content, compared to those of the first part of the connection member with a large gap between the terminal electrode surface and the opposing surface. Since the second part with a small gap between the terminal electrode surface and the opposing surface greatly contributes to a connection strength between the metal terminal and the chip component, a joint reliability during a temperature rising of the connection member can be improved by increasing a Sb content of the second part, compared to when the connection member has a uniform Sb content. In the ceramic electronic device according to the present invention, a joint reliability is secured even if the connection member is less used, and cracks of the chip component generated by an excessive use of the connection member can thereby be prevented from being formed. Thus, the ceramic capacitor according to the present invention has a favorable heat resistance even if a use amount of the connection member is small.

For example, the opposing surface may include a protrusion protruding toward the terminal electrode surface, and the second part may be located between the protrusion and the terminal electrode surface.

When the protrusion is formed on the opposing surface, the second part of the connection member can be disposed at a desired position, and the ceramic electronic device can thereby prevent manufacturing variations in joint strength and heat resistance.

For example, the second part may be surrounded by the first part.

In the connection member having this structure, an entire flow of the connection member is prevented due to an anchor effect of the second part even if the connection member starts flowing by temperature rising. Thus, the ceramic electronic device having the connection member can more effectively prevent release of connection between the metal terminal and the chip component during mounting.

For example, an area of the first part may be larger than that of the second area.

When the first part has a larger area, the ceramic electronic device can secure a favorable joint strength during a low temperature (non-temperature rising).

DETAILED DESCRIPTION OF INVENTION

Hereinafter, an embodiment of the present invention is described based on the figures.

Figure 1:
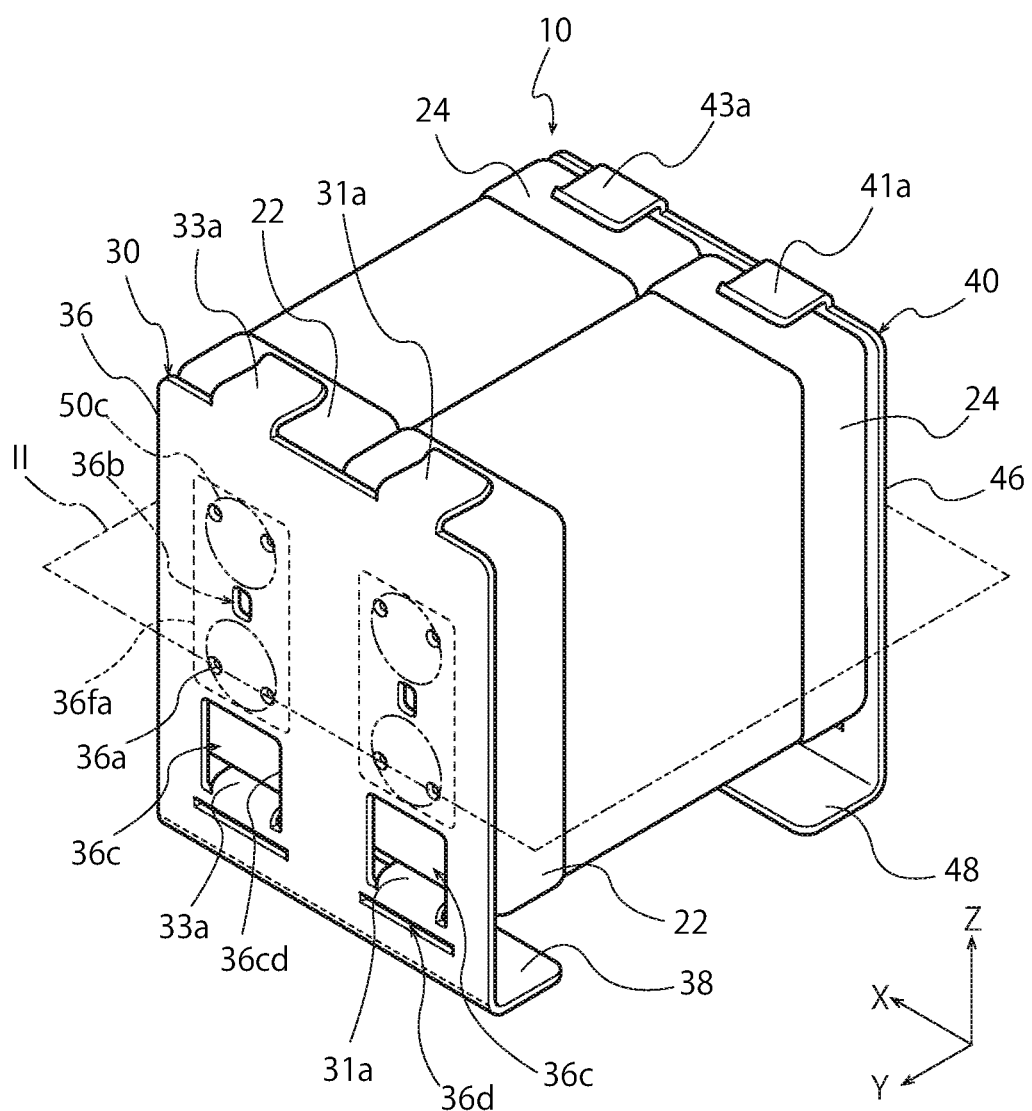
FIG. 1 is a perspective view of a ceramic electronic device according to the present invention.

FIG. 1 is a schematic perspective view illustrating a ceramic capacitor 10 according to an embodiment of the present invention. The ceramic capacitor 10 includes chip capacitors 20 as chip components and a pair of metal terminals 30 and 40. The ceramic capacitor 10 includes two chip capacitors 20, but may include one chip capacitor 20 or three or more chip capacitors 20.

Incidentally, the embodiment is described with an example of a ceramic capacitor where the metal terminals 30 and 40 are attached to the chip capacitors 20, but the ceramic electronic device of the present invention is not limited to this ceramic capacitor and may be a ceramic electronic device where the metal terminals 30 and 40 are attached to a chip component other than capacitors. As shown in FIG. 1, the embodiment is described with the Z-axis direction vertical to a mount surface, the Y-axis direction parallel to the mount surface and connecting both end surfaces of each chip capacitor 20, and the X-axis direction perpendicular to the Z-axis direction and the X-axis direction. The height direction is parallel to the Z-axis direction, and the horizontal direction is parallel to the X-Y plane.

Figure 2:
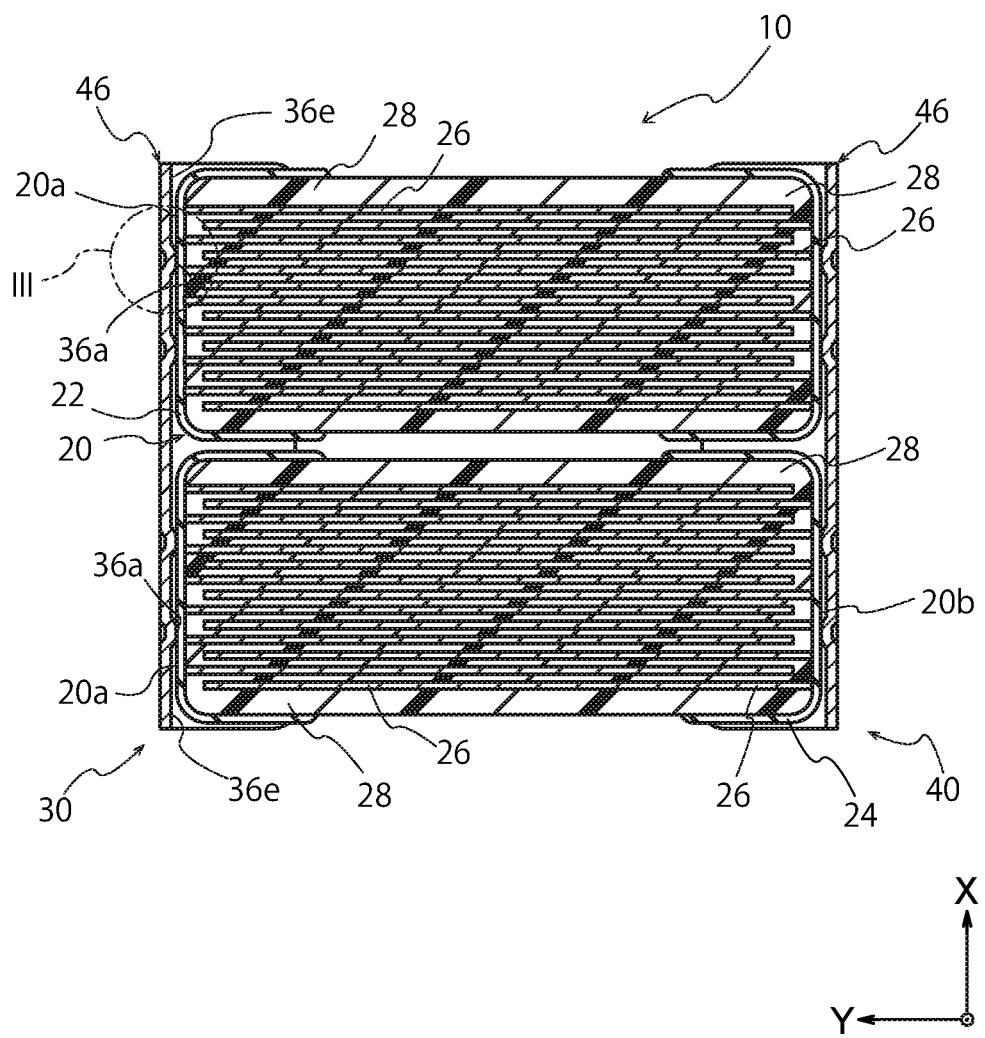
FIG. 2 is a cross-sectional view of the ceramic electronic device shown in FIG. 1.

Each of the chip capacitors 20 has an approximately rectangular-parallelepiped shape. The two chip capacitors 20 have approximately the same shape and size. As shown in FIG. 2, each of the chip capacitors 20 has a pair of chip end surfaces facing each other, and the pair of chip end surfaces is formed from a first end surface 20a and a second end surface 20b.

Each of the chip capacitors 20 is arranged so that the first end surface 20a and the second end surface 20b are vertical to the mount surface, in other words, sides of each chip capacitor 20 connecting the first end surface 20a and the second end surface 20b are parallel to the mount surface of the ceramic capacitor 10. Incidentally, the mount surface of the ceramic capacitor 10 is a surface where the ceramic capacitor 10 is attached by solder or so, and is a surface facing mount portions 38 and 48 of the metal terminals 30 and 40 mentioned below.

Each of the chip capacitors 20 includes two terminal electrodes. A first terminal electrode 22 is one of the two terminal electrodes and is formed on the first end surface 20a, and the first end surface 20a is entirely a terminal electrode surface. A second terminal electrode 24 is the other terminal electrode and is formed on the second end surface 20b, and the second end surface 20b is entirely a terminal electrode surface.

As shown in FIG. 1 and FIG. 2, the first terminal electrode 22 of each chip capacitor 20 is formed to reach from the first end surface 20a to a part of chip side surfaces adjacent to the first end surface 20a. Thus, each of the first terminal electrodes 22 has a part disposed on the first end surface 20a and a part disposed on the chip side surfaces. However, each of the first terminal electrodes 22 may have any other shape other than this shape and may be formed on only the first end surface 20a.

The second terminal electrode 24 of each chip capacitor 20 is formed to reach from the second end surface 20b to another part of the chip side surfaces (a different part from the part where the first terminal electrode 22 reaches). Thus, each of the second terminal electrodes 24 has a part disposed on the second end surface 20b and a part disposed on the chip side surfaces. The first terminal electrode 22 and the second terminal electrode 24 are arranged with a predetermined distance on the chip side surfaces. However, each of the second terminal electrodes 24 may have any other shape other than this shape and may be formed on only the second end surface 20b.

As shown in FIG. 2, which schematically illustrates an internal structure of the capacitor chips 20, the capacitor chips 20 are a multilayer capacitor where internal electrode layers 26 and dielectric layers 28 are laminated. In the internal electrode layers 26, internal electrode layers 26 connected with the first terminal electrode 22 and internal electrode layers 26 connected with the second terminal electrode 24 are laminated alternately by sandwiching the dielectric layers 28.

As shown in FIG. 2, each of the capacitor chips 20 has a lamination direction that is parallel (X-axis direction) to the mount surface, but may be held by the metal terminals 30 and 40 so as to have a lamination direction vertical to the mount surface.

The dielectric layers 28 of the chip capacitors 20 are composed of any dielectric material, such as calcium titanate, strontium titanate, barium titanate, and a mixture thereof. Each of the dielectric layers 28 has any thickness, but normally has a thickness of several µm to several hundred µm. In the present embodiment, each of the dielectric layers 28 preferably has a thickness of 1.0 to 5.0 µm. The dielectric layers 28 preferably have a main component of barium titanate, which can increase capacitance of capacitors.

The internal electrode layers 26 contain any conductive material, but may contain a comparatively inexpensive base metal when the dielectric layers 28 are composed of a reduction resistant material. The base metal is preferably Ni or a Ni alloy. The Ni alloy is preferably an alloy of Ni and one or more elements of Mn, Cr, Co, and Al, and preferably contains Ni at 95 wt % or more. Incidentally, Ni or the Ni alloy may contain various fine components, such as P, at about 0.1 wt % or less. The internal electrode layers 26 may be formed using a commercially available electrode paste. Each of the internal electrode layers 26 has a thickness appropriately determined based on usage or so.

The first and second terminal electrodes 22 and 24 are also composed of any material. The first and second terminal electrodes 22 and 24 are normally composed of copper, copper alloy, nickel, nickel alloy, or the like, but may be composed of silver, an alloy of silver and palladium, or the like. Each of the first and second terminal electrodes 22 and 24 also has any thickness, but normally has a thickness of about 10 to 50 µm. Incidentally, at least one metal film of Ni, Cu, Sn, etc. may be formed on the surfaces of the first and second terminal electrodes 22 and 24. Incidentally, the relation between the terminal electrodes 22 and the connection member is mentioned below with FIG. 3.

The chip capacitors 20 have shape and size that are appropriately determined based on object and usage. For example, each of the capacitor chips 20 has a length (Y-axis direction) of 1.0 to 6.5 mm, preferably 3.2 to 5.9 mm, a width (Z-axis direction) of 0.5 to 5.5 mm, preferably 1.6 to 5.2 mm, and a thickness (X-axis direction) of 0.3 to 3.2 mm, preferably 0.8 to 2.9 mm. When the ceramic capacitor 10 includes a plurality of capacitor chips 20, the capacitor chips 20 may have mutually different size and shape.

As shown in FIG. 1, the pair of metal terminals 30 and 40 of the capacitor 10 is arranged correspondingly with the first and second end surfaces 20a and 20b, which are a pair of chip end surfaces. That is, the first metal terminal 30, which is one of the pair of metal terminals 30 and 40, is disposed correspondingly with the first terminal electrode 22, which is one of the pair of terminal electrodes 22 and 24, and the second metal terminal 40, which is the other of the pair of metal terminals 30 and 40, is disposed correspondingly with the second terminal electrode 24, which is the other of the pair of terminal electrodes 22 and 24.

The first metal terminal 30 has an electrode facing portion 36, upper arm portions 31a and 33a and lower arm portions 31b and 33b, and a mount portion 38. The electrode facing portion 36 faces each of the first end surfaces 20a, which is a terminal electrode surface where the first terminal electrode 22 is formed. The upper arm portions 31a and 33a and the lower arm portions 31b and 33b constitute two pairs of engagement arm portions separately sandwiching and holding each of the chip capacitors 20 in the height direction. The mount portion 38 extends from the electrode facing portion 36 toward the chip capacitors 20 and is approximately perpendicular to the electrode facing portion 36.

As shown in FIG. 1, the electrode facing portion 36 has a substantially rectangular flat shape. As shown in FIG. 2, which is a cross-sectional view, the electrode facing portion 36 has a terminal inner surface 36e facing the first end surfaces 20a, which are terminal electrode surfaces of the chip capacitors 20. Although FIG. 2 does not illustrate, a connection member 60 with conductivity (see FIG. 3) is disposed between the first end surface 20a of the chip capacitor 20 and the terminal inner surface 36e of the first metal terminal 30 and joins the first end surface 20a and the terminal inner surface 36e. The connection member 60 is described below.

Each of the upper arm portions 31a and 33a has a base connected with the upper side of the electrode facing portion 36 and a tip extending toward the side surface of each chip capacitor 20 in the Y-axis direction. Each of the upper arm portions 31a and 33a contacts with the top surface of the chip capacitor 20 and sandwiches the chip capacitor 20 with each of the lower arm portions 31b and 33b.

Each of the lower arm portions 31b and 33b has a base connected with a periphery 36ca of a second through hole 36c formed on the electrode facing portion 36 and a tip extending toward the side surface of the chip capacitor 20 in the Y-axis direction. Each of the lower arm portions 31b and 33b contacts with the bottom surface of the chip capacitor 20. That is, the base of each of the lower arm portions 31b and 33b is connected with the lower side of the periphery 36ca with a substantially rectangular shape of the second through hole 36c, and each of the lower arm portions 31b and 33b bends and extends from the base toward above (positive side in the Z-axis direction) and inside (negative side in the Y-axis direction), contacts with the bottom surface of the chip capacitor 20, and supports the chip capacitor 20 from below (see FIG. 1).

As shown in FIG. 1, the lower arm portion 31b is in contact with the bottom surface of one chip capacitor 20 and supports it. The lower arm portion 33b is in contact within the bottom surface of another one chip capacitor 20 and supports it independently from the lower arm portion 31b. In the first metal terminal 30, the upper arm portion 31a (33a) and the lower arm portion 31b (33b) do not support plural chip capacitors 20 but support one chip capacitor 20, and the chip capacitors 20 can securely be supported even if they have manufacturing variations in dimension.

The mount portion 38 is connected with the lower side (negative side in the Z-axis direction) of the electrode facing portion 36. The mount portion 38 extends from the lower side toward the chip capacitors 20 (negative side in the Y-axis direction) and bends approximately perpendicularly to the electrode facing portion 36. Incidentally, the top surface of the mount portion 38, which is a surface of the mount portion 38 closer to the capacitor chips 20, preferably has a solder wettability that is lower than a solder wettability of the bottom surface of the mount portion 38 in order to prevent an excessive scattering of a solder used when the capacitor chips 20 are mounted on a board. Incidentally, the electrode facing portion 36 is provided with slits 36d respectively formed between the second through hole 36c connected with the lower arm portion 31b and the lower side of the electrode facing portion 36 connected with the mount portion 38. The slits 36d prevent a solder during mounting from creeping up on the electrode facing portion 36.

As shown in FIG. 1, the electrode facing portion 36 facing the first end surfaces 20a includes first through holes 36b. Two first through holes 36b are formed correspondingly with each chip capacitor 20 contained in the ceramic capacitor 10, but each of the first through holes 36b may have any other shape and number. Incidentally, each of the first through holes 36b is a through hole formed on the electrode facing portion 36 separately from the second through hole 36c, where each of the lower arm portions 31b and 33b is connected with the periphery 36ca.

The connection member 60 (see FIG. 3) configured to connect the electrode facing portion 36 and the first terminal electrode 22 is disposed around each of the first through holes 36b on the terminal inner surface 36e. As shown by the dotted lines 36fa of FIG. 1, the terminal inner surface 36e of the electrode facing portion 36 facing the first end surfaces 20a (terminal electrode surfaces) includes joint regions (inside the dotted lines 36fa) and a non-joint region (outside the dotted lines 36fa). In each of the joint regions, the space between the terminal inner surface 36e and the first end surface 20a is filled with the connection member 60. In the non-joint region, the space between the terminal inner surface 36e and the first end surface 20a is not filled with the connection member 60. The electrode facing portion 36 and the first terminal electrodes 22 are connected horizontally by the connection member 60 in the joint regions, but are not connected horizontally in the non-joint region. The space between the terminal inner surface 36e and the first end surfaces 20a in the non-joint region is as thick as an average thickness of the connection member 60 in the joint regions. In the present embodiment, the connection member 60 has an average thickness determined based on a protrusion height of protrusions 36a mentioned below.

The connection member 60 contains at least Sn and Sb, and preferably has a main component of Sn and Sb and conductivity. The connection member 60 forms a solder bridge between the periphery of the first through hole 36b and the first terminal electrode 22 and can strongly connect the electrode facing portion 36 and the first terminal electrode 22.

As shown in FIG. 1, each joint region of the terminal inner surface 36e is formed by applying a joint member material (a material of the connection member 60) to initial application regions 50c located on both sides of the first through hole 36b in the Z-axis direction. That is, after the application, each joint region shown by the dotted line 36fa in FIG. 1 is formed in such a manner that the connection member 50 applied on the initial application regions 50c spreads therearound by bringing a heated press head into contact with the terminal outer surface (opposite to the terminal inner surface 36e) of the electrode facing portion 36 and pushing and heating the terminal inner surface 36e of the electrode facing portion 36 against the first end surface 20a of the chip capacitor 20. The non-joint region (outside the dotted lines 36fa) is a region where the joint member material is not spread out. In the present embodiment, each of the joint regions has any area that is smaller than ¾ of an area of the first end surface 20a.

In the ceramic capacitor 10 manufactured in this manner, the terminal outer surface of the electrode facing portion 36 includes first surface roughness regions (inside the dotted lines 36fa) having a first surface roughness and a second surface roughness region (outside the dotted lines 36fa) having a second surface roughness that is smaller than the first surface roughness. The first surface roughness regions on the terminal outer surface and the second surface roughness region on the terminal outer surface are formed correspondingly on the opposite side to the joint regions of the terminal inner surface 36e and on the opposite side to the non-joint region of the terminal inner surface 36e, respectively. The first surface roughness regions are formed in such a manner that a plating (e.g., Sn plating) formed on the terminal outer surface is temporarily molten when the heated press head contacts with the terminal outer surface and is solidified once again after the press head is removed. Meanwhile, the second surface roughness region is formed on a part where the heated press head does not contact with the terminal outer surface.

Incidentally, each of the first through holes 36b may have any shape and size, and may not be formed in the electrode facing portion 36. If the first through holes 36b are formed in the electrode facing portion 36 as shown in FIG. 1, an application state of the joint member material on the terminal inner surface can be confirmed during manufacturing, and the formation of the connection member 60 on the terminal inner surface can easily be confirmed after manufacturing. Moreover, bubbles contained in the joint member material, such as solder, can be released via the first through holes 36b. This stabilizes the joint even if the amount of the joint member material, such as solder, is small.

As shown in FIG. 1 and FIG. 2, a plurality of protrusions 36a protruding toward the first end surface 20a of each chip capacitor 20 is formed on the terminal inner surface 36e of the electrode facing portion 36. The protrusions 36a control thickness and shape of the connection member 60 disposed between the electrode facing portion 36 and each first terminal electrode 22 and relate to positions of a first part 62 and a second part 64 mentioned below.

When the protrusions 36a are formed around each of the first through holes 36b, an area of the connection member 60, such as solder, to be formed can be adjusted, and the ceramic capacitor 10 can prevent acoustic noise while a joint strength between the electrode facing portion 36 and each of the first terminal electrodes 22 is being adjusted in an appropriate range. In the ceramic capacitor 10, four protrusions 36a are formed around each of the first through holes 36b, but any number and arrangement of the protrusions 36a may be employed.

Figure 3:
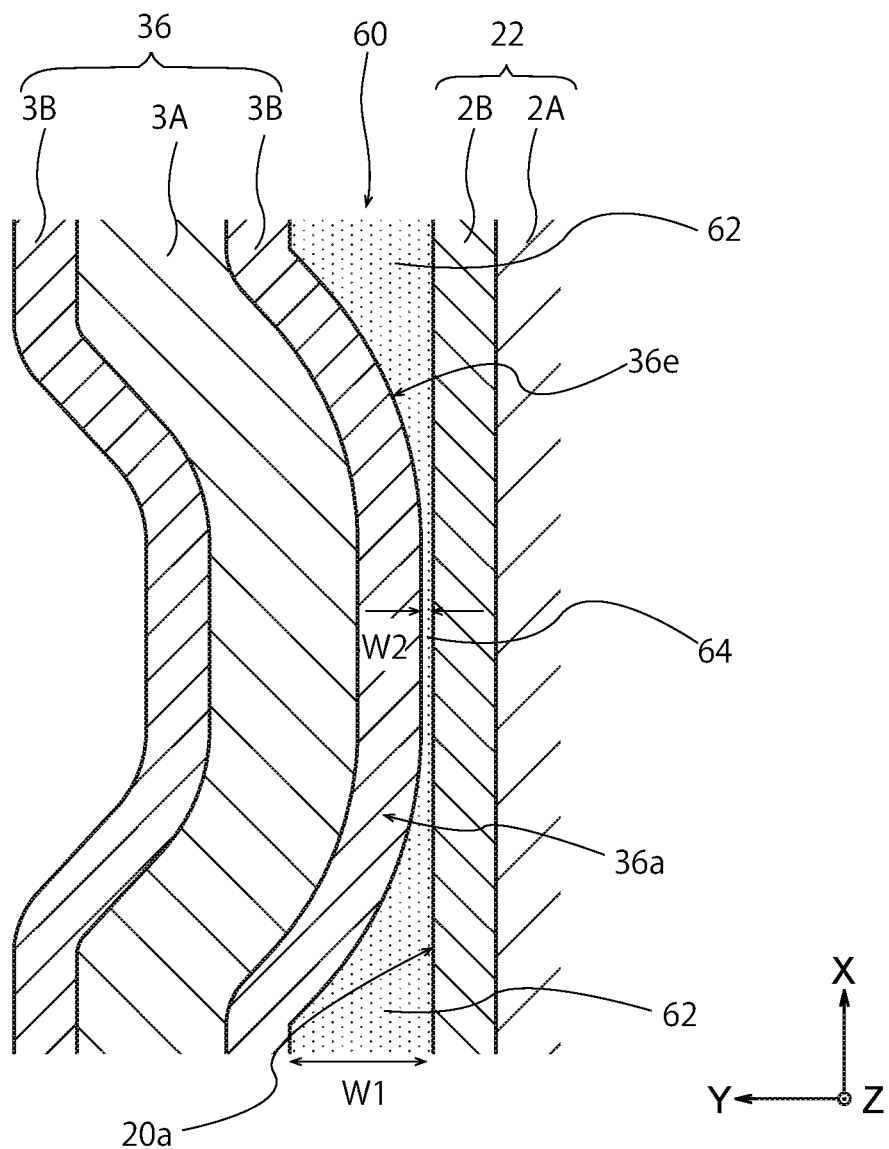
FIG. 3 is an enlarged view schematically illustrating a part of FIG. 2.

FIG. 3 is a schematically enlarged view of a joint part between the terminal inner surface 36e and the first end surface 20a shown in FIG. 2. As shown in FIG. 3, the connection member 60 includes a first part 62 and a second part 64, both of which have different Sb/Sn. In the first part 62, the first end surface 20a (a terminal electrode surface) and the terminal inner surface 36e (an opposing surface to the first end surface 20a) are arranged with a first distance W1, and Sb/Sn is a first value. In the second part 64, the first end surface 20a and the terminal inner surface 36e (W2 is smaller than W1) are arranged with a second distance W2, and Sb/Sn is a second value (the second value is larger than the first value).

The connection member 60 preferably contains a main component of Sn and Sb, but may contain a main component other than Sn and Sb or a fine component. For example, the first terminal electrode 22 connected with the connection member 60 includes an electrode base layer 2A containing Cu and an electrode surface layer 2B containing Ni and Sn, Cu, Ni, and Sn contained in the first terminal electrode 22 are diffused into the connection member 60 during joint, and Cu and Ni may be contained in the first part 62 and the second part 64 of the connection member 60. For example, the electrode facing portion 36 of the first metal terminal 30 connected with the connection member 60 includes surface parts 3B containing Sn and a base part 3A containing Fe, Ni, Cr, Cu, Sn, P, etc., Fe, Ni, Cr, Cu, Sn, P, etc. contained in the first metal terminal 30 are diffused into the connection member 60 during joint, and Fe, Ni, Cr, Cu, and P may be contained in the first part 62 and the second part 64 of the connection member 60.

As shown in FIG. 3, the first part 62 of the connection member 60 has a first distance W1 between the first end surface 20a and the terminal inner surface 36e and is disposed, for example, between the first end surface 20a and a part of the terminal inner surface 36e without the protrusions 36. The gap between the first end surface 20a and the terminal inner surface 36e in the first part 62 is larger than that in the second part 64. A value of Sb/Sn in the first part 62 (first value), which is a content ratio of Sb to Sn in the first part 62, is smaller than a value of Sb/Sn in the second part 64 (second value). That is, a relatively smaller amount of Sb is contained in the first part 62, which has a larger gap between the first end surface 20a and the terminal inner surface 36e.

Meanwhile, the second part 64 of the connection member 60 has a second distance W2 between the first end surface 20a and the terminal inner surface 36e and is disposed, for example, between the first end surface 20a and each of the protrusions 36a of the terminal inner surface 36e. The gap between the first end surface 20a and the terminal inner surface 36e in the second part 64 is smaller than that in the first part 62. A value of Sb/Sn in the second part 64 (second value), which is a content ratio of Sb to Sn in the second part 64, is larger than a value of Sb/Sn in the first part 62 (first value). That is, a relatively larger amount of Sb is contained in the second part 64, which has a smaller gap between the first end surface 20a and the terminal inner surface 36e.

Since the protrusions 36a are formed within each of the joint regions shown by the dotted lines 36fa in FIG. 1, the first part 62, which has a larger gap between the first end surface 20a and the terminal inner surface 36e, surrounds the second part 64 disposed between each of the protrusions 36a and the first end surface 20a.

The connection member 60 including the first part 62 and the second part 64 with different values of Sb/Sn can be formed, for example, by preparing two solders (joint member materials) having different values of Sb/Sn, applying the solder having a larger value of Sb/Sn onto the terminal inner surface 36e or the first end surface 20a corresponding to each of the protrusions 36a, applying the solder having a smaller value of Sb/Sn onto the terminal inner surface 36e or the first end surface 20a around each of the protrusions 36a, and thereafter heating and joining the two solders. Instead, the connection member 60 may be formed by another method. For example, the first part 62 and the second part 64 of the connection member 60 are formed by adjusting how heat travels to the joint member materials and the connection member 60 during joint.

As is the case with the first metal terminal 30, the second metal terminal 40 shown in FIG. 1 and FIG. 2 has an electrode facing portion 46, upper arm portions 41a and 43a and lower arm portions, and a mount portion 48. The electrode facing portion 46 faces each of the second end surfaces 20b, which is a terminal electrode surface where the second terminal electrode 24 is formed. The upper arm portions 41a and 43a and the lower arm portions constitute two pairs of engagement arm portions separately sandwiching and holding each of the chip capacitors 20 in the height direction. The mount portion 48 extends from the electrode facing portion 46 toward the chip capacitors 20 and is approximately perpendicular to the electrode facing portion 46. As shown in FIG. 1, the second metal terminal 40 is disposed symmetrically to the first metal terminal 30 and is different from the first metal terminal 30 in arrangement to the chip capacitors 20. The second metal terminal 40 is, however, different from the first metal terminal 30 only in arrangement and has a similar shape to the first metal terminal 30. Thus, the second metal terminal 40 is not described in detail.

The ceramic capacitor 10 shown in FIG. 1 can be manufactured by, for example, preparing the chip capacitors 20, the metal terminals 30 and 40, and two joint member materials (solder paste and solder cream) with different ratios of Sb/Sn, joining the chip capacitors 20 and the metal terminals 30 and 40 using the joint member materials, and forming the connection member 60. The chip capacitors 20 can be manufactured by a normal method where the first and second terminal electrodes 22 and 24 are formed by plating after an element body is formed by laminating and firing green sheets, but may be manufactured by other methods.

The metal terminals 30 and 40 can be manufactured by, for example, machining a metal plate (base part 3A) and forming surface parts 3B on the surfaces of the base part 3A by plating or so. The joint member materials to be a raw material of the connection member 60 may contain Ag, Cu, and other components, in addition to Sb, Sn, and flux.

To improve heat resistance of the second part 64, Sb(B)/Sb(A) is preferably 1.2 to 5.0, more preferably 1.3 to 3.0, where Sb(A) and Sb(B) are Sb/Sn in the first and second parts 62 and 64 shown in FIG. 3, respectively. To enhance a reinforcement effect of the second part 64, the second distance W2 between the first end surface 20a and the terminal inner surface 36e in the second part 64 is preferably 1 to 20 µm, more preferably 2 to 12 µm.

In the example of FIG. 1, the second part 64 is disposed correspondingly to each of the protrusions 36a. The number of second parts 64 to be formed is not limited, but one or more second parts 64 are preferably arranged in the joint between the first end surface 20a of one chip capacitor 20 and the terminal inner surface 36e of one metal terminal 30 (40), and a plurality of second parts 64 is preferably arranged in the joint between the first end surface 20a of one chip capacitor 20 and the terminal inner surface 36e of one metal terminal 30 (40) so as to enhance a joint reliability between the chip capacitor 20 and the metal terminal 30 (40) during temperature rising.

In the ceramic capacitor 10 shown in FIG. 1 to FIG. 3, the second part 64 is effectively prevented from being softened and flowed during temperature rising by increasing a Sb content of the second part 64 of the connection member 60 having a small gap between the first end surface 20a and the terminal inner surface 36e as shown in FIG. 3. This enables the second part 64 to function as an anchor that links the first end surface 20a and the terminal inner surface 36e during temperature rising. Thus, the ceramic capacitor 10 having the second parts 64 can improve a joint reliability of the connection member 60 during temperature rising, compared to when the connection member has a uniform Sb content. In the ceramic capacitor 10, the joint reliability is thereby secured even if the connection member 60 is less used, and cracks of the chip capacitors 20 generated by an excessive use of the connection member can thereby be prevented from being formed. Thus, the ceramic capacitor 10 has a favorable heat resistance even if a use amount of the connection member 60 is small.

In the ceramic capacitor 10, a Sn content of the first part 62 of the connection member 60 is higher than that of the second part 64 of the connection member 60, and the first part 62 is easily wet and spread during molten. Since the first part 62, which is easily wet and spread, is disposed at a position having a large gap between the first end surface 20a and the terminal inner surface 36e, the ceramic capacitor 10 can have large joint areas between the terminal inner surface 36e and the connection member 60 and between the first end surface 20a and the connection member 60. Thus, the ceramic capacitor 10 having the first parts 62 has a favorable joint strength during a low temperature (non-temperature rising). When areas (joint areas) of the first parts 62 and the second parts 64 contained in the connection member 60 are compared, an area of the first parts 62 is preferably larger than an area of the second parts 64 so as to increase a joint area and secure a joint strength.

When the protrusions 36a are formed on the terminal inner surface 36e, each of the second parts 64 of the connection member 60 can be disposed at a desired position, and the ceramic capacitor 10 can thereby prevent manufacturing variations in joint strength and heat resistance. As shown in FIG. 3, the second part 64 may be surrounded by the first part 62, which prevents an entire flow of the connection member 60 due to an anchor effect of the second part 64 even if the connection member 60 starts flowing by temperature rising.

The present invention is accordingly described with the embodiment, but is not limited thereto and, needless to say, is applicable to various electronic devices with metal terminal. The present invention includes various embodiments and variations of electronic devices with metal terminal, for example, having different numbers of metal terminals and chip components, different shapes of metal terminal and chip component, different arrangements of terminal electrode surface and its facing surface, and the like from those of the embodiment. In the above-mentioned embodiment, the connection member 60 formed between the first end surface 20a of the chip capacitor 20 and the first metal terminal 30 has a similar structure to the connection member formed between the second end surface 20b and the second metal terminal 40, but these two connection members may have different structures.

DESCRIPTION OF THE REFERENCE NUMERICAL

10 . . . ceramic capacitor
20 . . . chip capacitor
20a . . . first end surface
20b . . . second end surface
22 . . . first terminal electrode
24 . . . second terminal electrode
26 . . . internal electrode layer
28 . . . dielectric layer
30 . . . first metal terminal
40 . . . second metal terminal
31a, 33a, 41a, 43a . . . upper arm portion
31b, 33b . . . lower arm portion
36, 46 . . . electrode facing portion
36a . . . protrusion
36b . . . first through hole
36c . . . second through hole
36ca . . . periphery
36d . . . slit
36e . . . terminal inner surface
36fa . . . dotted line
38, 48 . . . mount portion
50c . . . initial application region
60 . . . connection member
62 . . . first part
64 . . . second part
W1 . . . first distance
W2 . . . second distance
2A . . . electrode base layer
2B . . . electrode surface layer
3A . . . base part
3B . . . surface part

What is claimed is:
1. A ceramic electronic device comprising:
a chip component including a terminal electrode surface on which a terminal electrode is formed;
a metal terminal including an opposing surface to the terminal electrode surface; and a conductive connection member containing at least Sn and Sb and configured to connect the terminal electrode surface and the opposing surface, wherein the connection member comprises:
- a first part whose distance between the terminal electrode surface and the opposing surface is a first distance and whose Sb/Sn is a first value; and
- a second part whose distance between the terminal electrode surface and the opposing surface is a second distance being smaller than the first distance and whose Sb/Sn is a second value being larger than the first value.

2. The ceramic electronic device according to claim 1,
wherein the opposing surface includes a protrusion protruding toward the terminal electrode surface, and
wherein the second part is located between the protrusion and the terminal electrode surface.

3. The ceramic electronic device according to claim 1, wherein the second part is surrounded by the first part.

4. The ceramic electronic device according to claim 1, wherein an area of the first part is larger than that of the second part.

* * * * *